(12) United States Patent
Matsumoto

(10) Patent No.: US 9,251,307 B2
(45) Date of Patent: Feb. 2, 2016

(54) CIRCUIT INFORMATION PROCESSING DEVICE, CIRCUIT INFORMATION PROCESSING SYSTEM, DATABASE, NON-TRANSITORY COMPUTER READABLE MEDIUM, AND CIRCUIT DESIGN METHOD

(71) Applicant: FUJI XEROX CO., LTD., Tokyo (JP)

(72) Inventor: Daisuke Matsumoto, Kanagawa (JP)

(73) Assignee: Fuji Xerox CO., Ltd, Tokyo (JP)

( * ) Notice: Subject to any disclaimer, the term of this patent is extended or adjusted under 35 U.S.C. 154(b) by 93 days.

(21) Appl. No.: 14/267,171

(22) Filed: May 1, 2014

(65) Prior Publication Data

US 2015/0154342 A1 Jun. 4, 2015

(30) Foreign Application Priority Data

Dec. 3, 2013 (JP) .................................. 2013-250014

(51) Int. Cl.
*G06F 17/00* (2006.01)
*G06F 17/50* (2006.01)
(52) U.S. Cl.
CPC ........ *G06F 17/5081* (2013.01); *G06F 17/5072* (2013.01); *G06F 17/5077* (2013.01)
(58) Field of Classification Search
USPC ........................................................ 716/119
See application file for complete search history.

(56) References Cited

U.S. PATENT DOCUMENTS

| 5,856,926 | A  | * | 1/1999 | Matsumoto | ........... | G06F 17/505 |
| | | | | | | 716/103 |
| 7,047,514 | B2 | * | 5/2006 | Mizuno | ................. | H01L 27/118 |
| | | | | | | 257/E27.105 |
| 7,107,565 | B1 | * | 9/2006 | Lindholm | ........... | G06F 17/5054 |
| | | | | | | 716/117 |
| 7,111,110 | B1 | * | 9/2006 | Pedersen | .............. | G11C 7/1006 |
| | | | | | | 710/8 |
| 2004/0133860 | A1 | * | 7/2004 | Hieter | ................. | G06F 17/5072 |
| | | | | | | 716/105 |

* cited by examiner

*Primary Examiner* — Mohammed Alam
(74) *Attorney, Agent, or Firm* — Oliff PLC

(57) ABSTRACT

A circuit information processing device includes an evaluating unit that evaluates complexity of placement and routing of each of multiple circuit configurations, the multiple circuit configurations each having a common portion common to the multiple circuit configurations and a non-common portion not common to the multiple circuit configurations, a selecting unit that selects, from among the multiple circuit configurations, a reference circuit configuration evaluated by the evaluating unit as satisfying a predetermined criterion, and a generating unit that causes first placement and routing information to be shared by circuit configurations other than the reference circuit configuration, and generates second placement and routing information for each of the circuit configurations other than the reference circuit configuration, the first placement and routing information being information for placing and routing the common portion of the reference circuit configuration, the second placement and routing information being information for placing and routing the non-common portion.

12 Claims, 6 Drawing Sheets

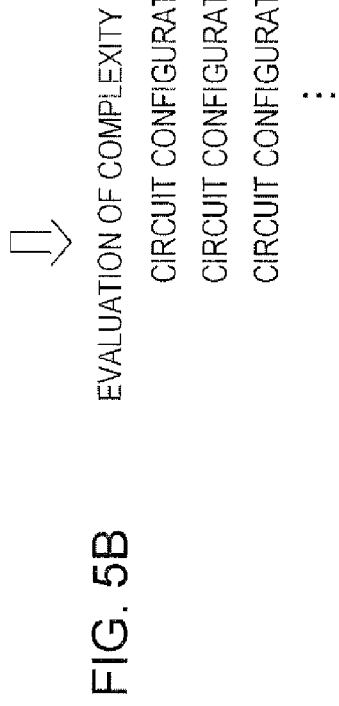

FIG. 6

<DATABASE (CORRESPONDENCE DATA ON MULTIPLE CIRCUITS)>

| CIRCUIT NO. | FB LOOP COUNT (x1) | PLACE-AND-ROUTE TIME (x2) | ROUTING COUNT (x3) | PE COUNT (x4) | COMPLEXITY (S) |
|---|---|---|---|---|---|
| CIRCUIT 1 | 5 | 2200 | 3400 | 50 | 1000 |
| CIRCUIT 2 | 3 | 1100 | 4400 | 20 | 600 |
| CIRCUIT 3 | 3 | 800 | 6800 | 100 | 700 |
| CIRCUIT 4 | 2 | 500 | 3000 | 50 | 500 |
| CIRCUIT 5 | 1 | 500 | 1000 | 30 | 200 |
| ... | ... | ... | ... | ... | ... |

$$\text{(EVALUATION INDEX) MATRIX } X = \begin{pmatrix} 5 & 2200 & 3400 & 50 \\ 3 & 1100 & 4400 & 20 \\ 3 & 800 & 6800 & 100 \\ 2 & 500 & 3000 & 50 \\ 1 & 500 & 1000 & 30 \end{pmatrix}$$

$$\text{(COEFFICIENT) MATRIX } \alpha = \begin{pmatrix} \alpha 1 \\ \alpha 2 \\ \alpha 3 \\ \alpha 4 \end{pmatrix}$$

$$\text{(COMPLEXITY) MATRIX } S = \begin{pmatrix} 1000 \\ 600 \\ 700 \\ 500 \\ 200 \end{pmatrix}$$

CIRCUIT INFORMATION PROCESSING DEVICE, CIRCUIT INFORMATION PROCESSING SYSTEM, DATABASE, NON-TRANSITORY COMPUTER READABLE MEDIUM, AND CIRCUIT DESIGN METHOD

CROSS-REFERENCE TO RELATED APPLICATIONS

This application is based on and claims priority under 35 USC 119 from Japanese Patent Application No. 2013-250014 filed Dec. 3, 2013.

BACKGROUND (i) Technical Field

The present invention relates to a circuit information processing device, a circuit information processing system, a database, a non-transitory computer readable medium, and a circuit design method.

(ii) Related Art

In recent years, reconfigurable circuits (dynamically reconfigurable circuits) capable of dynamically reconfiguring their internal circuit configuration have been developed, and various devices utilizing a reconfigurable circuit have been proposed. By utilizing a reconfigurable circuit, for example, data processing circuits corresponding to multiple pieces of data processing are configured (reconfigured) within the reconfigurable circuit so that the data processing circuits are switched between each other, thereby enabling the multiple pieces of data processing to be implemented by the reconfigurable circuit.

A reconfigurable circuit includes multiple processor elements (PEs). A reconfigurable circuit determines the placement of multiple PEs and routing between the PEs on the basis of reconfiguration data (config data), thereby implementing a circuit according to the reconfiguration data.

As a reconfiguration process of a reconfigurable circuit, partial reconfiguration exists in addition to full reconfiguration that fully reconfigures multiple PEs. In partial reconfiguration, a circuit formed by some PEs is maintained while partially reconfiguring other PEs.

Partial reconfiguration, which maintains a circuit formed by some PEs, has the following constraint: these PEs be not used for partial reconfiguration, and their placement be fixed. Therefore, constrained placement and routing such as partial reconfiguration is difficult in comparison to full reconfiguration that does not maintain a circuit formed by some PEs and has no such constraint. The term placement and routing refers to making logic elements applied by logic synthesis correspond to physical logic elements on a circuit.

SUMMARY

According to an aspect of the invention, there is provided a circuit information processing device including an evaluating unit that evaluates complexity of placement and routing of each of a plurality of circuit configurations, the plurality of circuit configurations each having a common portion and a non-common portion, the common portion being a portion common to the plurality of circuit configurations, the non-common portion being a portion not common to the plurality of circuit configurations, a selecting unit that selects a reference circuit configuration from among the plurality of circuit configurations, the reference circuit configuration being a circuit configuration evaluated by the evaluating unit as satisfying a predetermined criterion, and a generating unit that causes first placement and routing information to be shared by circuit configurations other than the reference circuit configuration, and generates second placement and routing information for each of the circuit configurations other than the reference circuit configuration, the first placement and routing information being information for placing and routing the common portion of the reference circuit configuration selected by the selecting unit, the second placement and routing information being information for placing and routing the non-common portion.

BRIEF DESCRIPTION OF THE DRAWINGS

Exemplary embodiments of the present invention will be described in detail based on the following figures, wherein:

FIGS. 5A to 5C illustrate a specific example of processing from acquisition of evaluation indices to selection of the most complex circuit; and FIG. 6 illustrates a specific example of a database.

DETAILED DESCRIPTION

Figure 1:
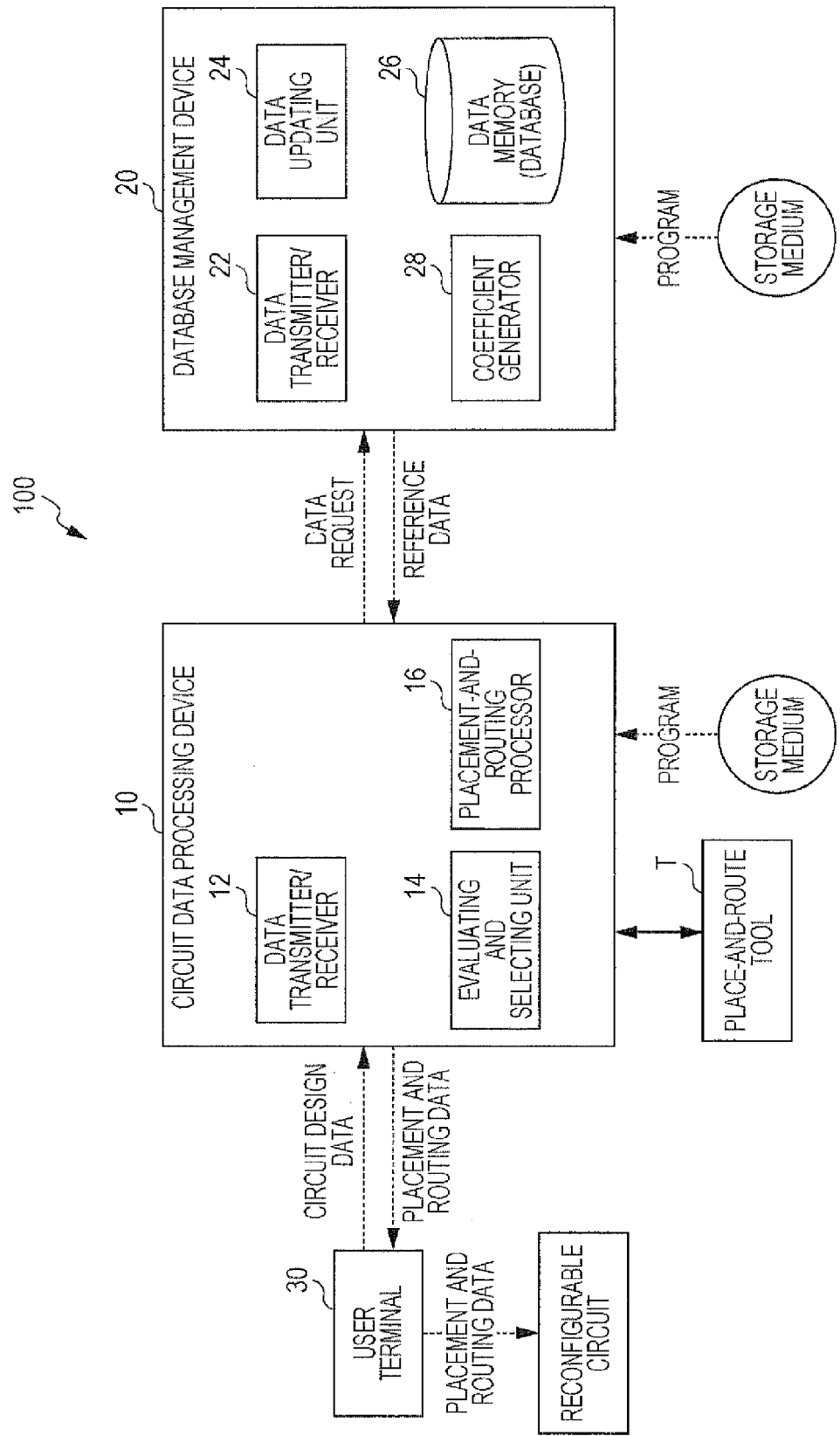
FIG. 1 illustrates a circuit data processing system according to an exemplary embodiment of the invention.

FIG. 1 illustrates a circuit data processing system 100 according to an exemplary embodiment of the invention. The circuit data processing system 100 illustrated in FIG. 1 has a circuit data processing device 10 and a database management device 20. The circuit data processing system 100, the circuit data processing device 10, and the database management device 20 illustrated in FIG. 1 are specific examples of a circuit information processing system, a circuit information processing device, and a database device according to exemplary embodiments of the invention, respectively.

The circuit data processing device 10 obtains, for multiple circuit configurations to be placed and routed in a reconfigurable circuit, pre-placement-and-routing circuit design data about each of the circuit configurations from a user, and provides placement and routing data for placing and routing each circuit configuration to the user. The circuit data processing device 10 includes a data transmitter/receiver 12, an evaluating and selecting unit 14, and a placement-and-routing processor 16.

The data transmitter/receiver 12 receives circuit design data transmitted from a user terminal 30 used by the user, via a communication line such as the Internet, for example. Alternatively, the circuit data processing device 10 may include the function of reading data from a storage medium such as an optical disc or a semiconductor memory, for example, and circuit design data may be provided to the circuit data processing device 10 from the user while being stored on a storage medium. Of course, circuit design data may be inputted via a user operation device or the like included in the circuit data processing device 10.

The evaluating and selecting unit 14 obtains evaluation indices with respect to multiple circuit configurations, on the basis of a placement and routing process executed in accordance with circuit design data about each of the circuit configurations. The evaluation indices relate to the placement and routing of each of the circuit configurations on a reconfigurable circuit. The placement and routing process is performed by using a place-and-route tool T. Then, the evaluating and selecting unit 14 evaluates the complexity of placement and routing of each circuit configuration on the basis of the evaluation indices related to the placement and routing of each circuit configuration, and selects a circuit configuration that satisfies a criterion for the complexity of placement and routing from among the multiple circuit configurations. The processing executed in the evaluating and selecting unit 14 will be described later in more detail.

The placement-and-routing processor 16 obtains placement and routing data for each of multiple circuit configurations, on the basis of a placement and routing process having the following constraint: placement and routing data related to some of circuits included in a circuit configuration selected by the evaluating and selecting unit 14 be shared by the multiple circuit configurations. The constrained placement and routing process is performed by using the place-and-route tool T. The processing executed in the placement-and-routing processor 16 will be described later in more detail.

The data transmitter/receiver 12 transmits placement and routing data obtained in the placement-and-routing processor 16 to the user terminal 30 via a communication line such as the Internet. The circuit data processing device 10 may include, for example, the function of writing data to a storage medium such as an optical disc or a semiconductor memory, and placement and routing data may be provided to the user from the circuit data processing device 10 while being stored on a storage medium.

The circuit data processing device 10 is implemented by, for example, a computer. That is, a program (software) corresponding to the functions of the data transmitter/receiver 12, the evaluating and selecting unit 14, and the placement-and-routing processor 16 is read into a computer, and the computer is caused to implement the functions of the data transmitter/receiver 12, the evaluating and selecting unit 14, and the placement-and-routing processor 16 through cooperation of hardware resources provided in the computer and software read into the computer. The hardware resources include, for example, a computing unit such as a CPU, a storage such as a memory or a hard disk, a communication unit using the Internet or the like, a unit that reads data from a storage medium such as an optical disc or a semiconductor memory, and a unit that writes data to a storage medium.

A program may be provided to the computer (the circuit data processing device 10) via, for example, a communication line such as the Internet, or may be provided to the computer (the circuit data processing device 10) while being stored on a storage medium such as an optical disc. The computer (the circuit data processing device 10) may be caused to implement the function of the place-and-route tool T by a program corresponding to the place-and-route tool T.

The database management device 20 provides reference data based on a database to the circuit data processing device 10 upon request from the circuit data processing device 10. The database management device 20 includes a data transmitter/receiver 22, a data updating unit 24, a data memory 26, and a coefficient generator 28.

The data memory 26 includes, for example, a storage device such as a hard disk, and stores a database. The database accumulates the correspondence between evaluation indices related to the placement and routing of each circuit on a reconfigurable circuit and the complexity of the placement and routing. A specific example of a database will be described later in detail.

The data stored as a database in the data memory 26, that is, correspondence data indicative of the correspondence between evaluation indices and complexity, is provided to the database management device 20 via a communication line such as the Internet. Alternatively, the database management device 20 may include the function of reading data from a storage medium such as an optical disc or a semiconductor memory, for example, and correspondence data may be provided to the database management device 20 while being stored on a storage medium. Alternatively, correspondence data may be inputted via a user operation device or the like included in the database management device 20.

The data updating unit 24 updates the database by adding newly acquired correspondence data to the database. Alternatively, the data updating unit 24 may update the database by modifying correspondence data already stored in the data memory 26.

The coefficient generator 28 generates coefficient data for a calculation formula used to calculate a complexity from evaluation indices, on the basis of correspondence data about multiple circuits accumulated in the database. The processing executed in the coefficient generator 28 will be described later in more detail.

When the data transmitter/receiver 22 receives a data request from the circuit data processing device 10 via a communication line such as the Internet, reference data based on the correspondence about multiple circuits accumulated in the database is transmitted upon the request to the circuit data processing device 10 from the data transmitter/receiver 22. The database management device 20 may include, for example, the function of writing data to a storage medium such as an optical disc or a semiconductor memory, and reference data may be provided to the circuit data processing device 10 from the database management device 20 while being stored on a storage medium.

The database management device 20 is implemented by, for example, a computer. That is, a program (software) corresponding to the functions of the data transmitter/receiver 22, the data updating unit 24, the data memory 26, and the coefficient generator 28 is read into a computer, and the computer is caused to implement the functions of the data transmitter/receiver 22, the data updating unit 24, the data memory 26, and the coefficient generator 28 through cooperation of hardware resources provided in the computer and software read into the computer. The hardware resources include, for example, a computing unit such as a CPU, a storage such as a memory or a hard disk, a communication unit using the Internet or the like, a unit that reads data from a storage medium such as an optical disc or a semiconductor memory, and a unit that writes data to a storage medium.

A program may be provided to the computer (the database management device 20) via, for example, a communication line such as the Internet, or may be provided to the computer (the database management device 20) while being stored on a storage medium such as an optical disc.

The general configuration of the circuit data processing system 100 is as described above. Next, a detailed description will be given of processing or the like executed by the circuit data processing system 100. In the following description, those configurations (portions) which are illustrated in FIG. 1 will be denoted by the reference signs used in FIG. 1.

A reconfigurable circuit is a circuit capable of reconfiguring its internal logic circuit configuration dynamically, that is, while the circuit is operating. A reconfigurable circuit includes, for example, a large number of PEs. By determining the placement of such a large number of PEs and the routing between the PEs, circuits according to reconfiguration data can be reconfigured (recombined) at relatively high speed, and such reconfigured circuit configuration portions each function as a data processing circuit. For example, a reconfigurable circuit is incorporated into a device that executes data processing such as image processing, and used for various kinds of data processing.

Reconfiguration processes of a reconfigurable circuit include full reconfiguration that fully reconfigures multiple PEs, and partial reconfiguration that maintains a circuit formed by some PEs while partially reconfiguring other PEs.

Figure 2:
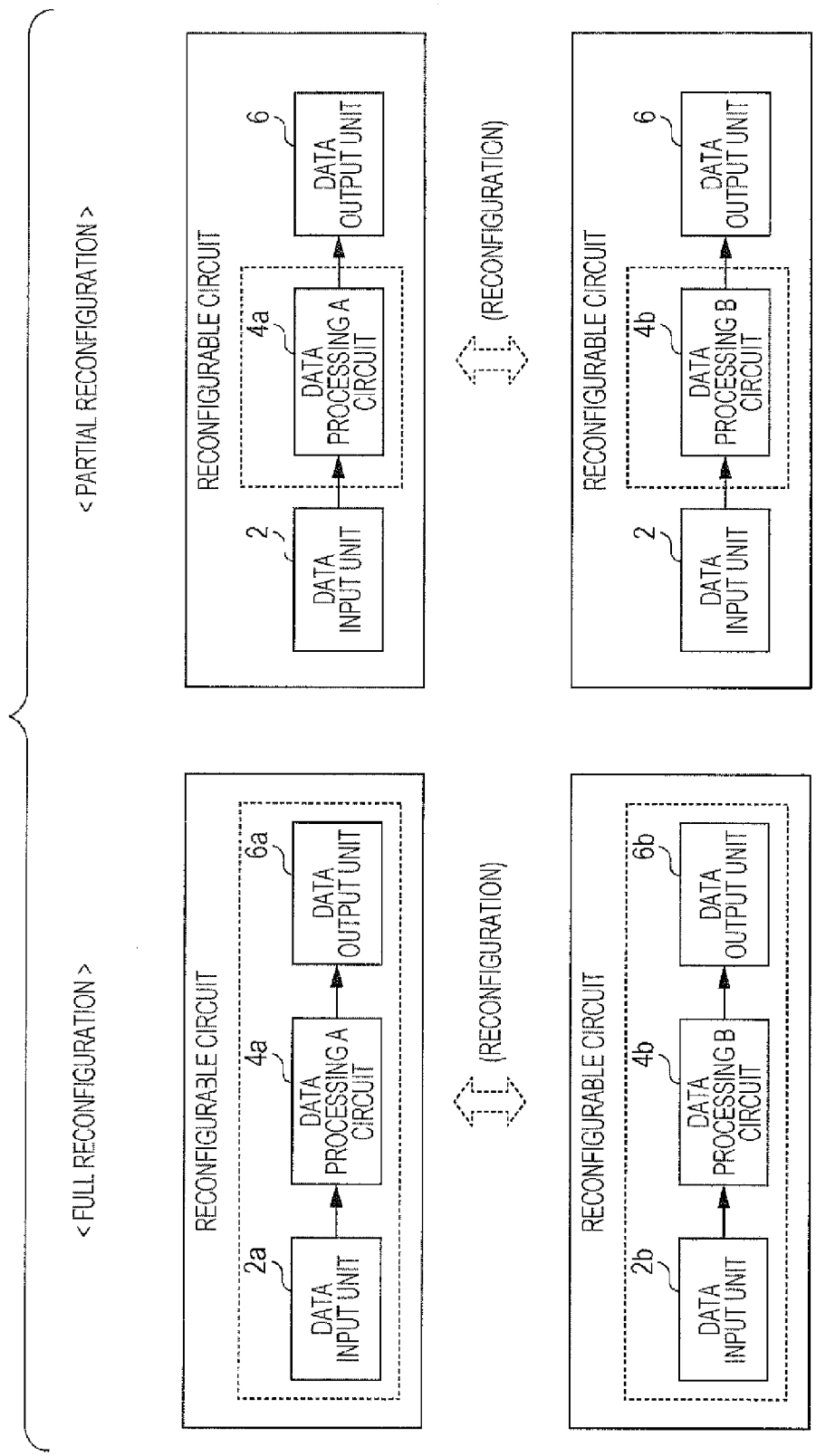
FIG. 2 illustrates specific examples of full reconfiguration and partial reconfiguration.

FIG. 2 illustrates specific examples of full reconfiguration and partial reconfiguration. FIG. 2 illustrates a case in which a data input unit 2 (2a or 2b), a data processing A circuit 4a or data processing B circuit 4b, and a data output unit 6 (6a or 6b) are reconfigured in a reconfigurable circuit.

In full reconfiguration, for example, the data input unit 2a, the data processing A circuit 4a, and the data output unit 6a are configured in a reconfigurable circuit. When it is necessary to switch from a process using the data processing A circuit 4a to a process using the data processing B circuit 4b, the reconfigurable circuit is reconfigured, and the data input unit 2b, the data processing B circuit 4b, and the data output unit 6b are configured in the reconfigurable circuit. In this way, according to full reconfiguration, the entirety of a reconfigurable circuit is reconfigured.

In partial reconfiguration, for example, the data input unit 2, the data processing A circuit 4a, and the data output unit 6 are configured in a reconfigurable circuit. When it is necessary to switch from a process using the data processing A circuit 4a to a process using the data processing B circuit 4b, only the data processing A circuit 4a is switched to the data processing B circuit 4b. That is, in partial reconfiguration, of all the circuits in a reconfigurable circuit, only the data processing A circuit 4a is partially reconfigured to the data processing B circuit 4b while the data input unit 2 and the data output unit 6 are maintained.

In partial reconfiguration, the data processing A circuit 4a and the data processing B circuit 4b can be switched between each other, while keeping data intact in the data input unit 2 and the data output unit 6 before and after the reconfiguration process. Therefore, in comparison to full reconfiguration, partial reconfiguration makes the data input time (the time taken for data to reach the entire pipeline) and the data output time (the time taken until data exits the pipeline) shorter.

However, in partial reconfiguration, only the data processing A circuit 4a and the data processing B circuit 4b are reconfigured while keeping the data input unit 2 and the data output unit 6 intact in the reconfigurable circuit. Therefore, partial reconfiguration requires more complex placement and routing for reconfiguration in comparison to full reconfiguration.

Figure 3:
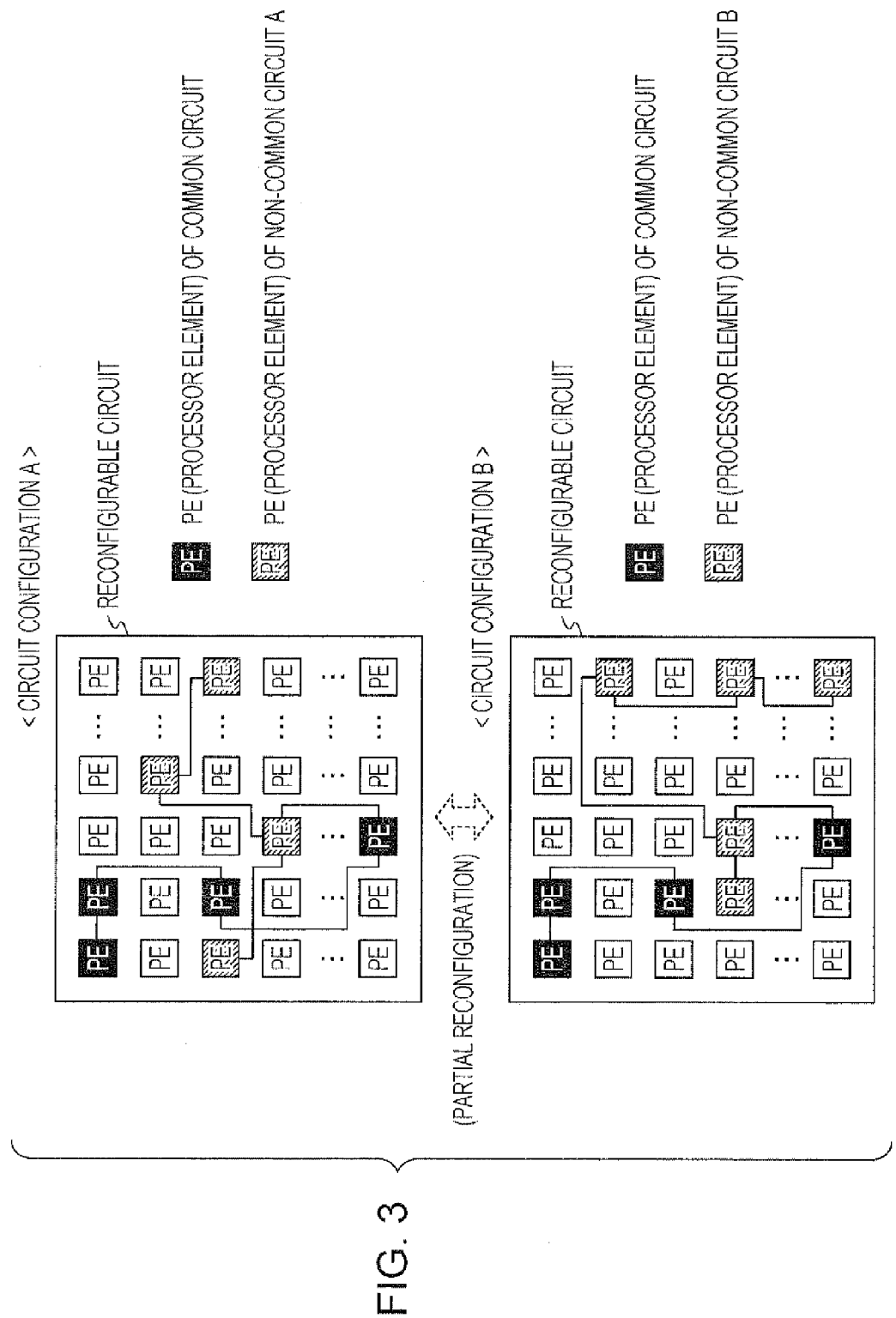
FIG. 3 illustrates an example of placement and routing in partial reconfiguration.

FIG. 3 illustrates a specific example of placement and routing in partial configuration. A reconfigurable circuit has a large number of (for example, about several hundreds to several thousands of) PEs provided inside the circuit. By determining the placement of such a large number of PEs (selecting the PEs to be used) and the routing between PEs, that is, through placement and routing (fitting) of PEs, a circuit according to reconfiguration data is formed in the reconfigurable circuit.

FIG. 3 depicts a specific example of placement and routing from a circuit configuration A to a circuit configuration B, or from the circuit configuration B to the circuit configuration A. The circuit configuration A includes a common circuit and a non-common circuit A, and the circuit configuration B includes a common circuit and a non-common circuit B.

A common circuit is a circuit that is common to multiple circuit configurations, that is, the circuit configuration A and the circuit configuration B. For example, in the specific example of partial reconfiguration illustrated in FIG. 2, each of the data input unit 2 and the data output unit 6 is a common circuit. A non-common circuit is a circuit that varies with each individual circuit configuration, that is, a circuit that differs between the circuit configuration A and the circuit configuration B. For example, in the specific example of partial reconfiguration illustrated in FIG. 2, each of the data processing A circuit 4a and the data processing B circuit 4b is a non-common circuit.

In partial reconfiguration, as illustrated in FIG. 3, for example, the placement and routing of PEs that form a common circuit is maintained without being changed during the reconfiguration between the circuit configuration A and the circuit configuration B, and only the placement and routing of PEs that form non-common circuits A and B is changed during the reconfiguration between the circuit configuration A and the circuit configuration B.

As described above, partial reconfiguration has the constraint that while maintaining the placement and routing of PEs that form a common circuit, the placement and routing of a non-common circuit is to be implemented by using the remaining PEs. Consequently, in comparison to full reconfiguration that allows placement and routing to be performed for each individual circuit configuration with all PEs being objects to be selected, for example, constrained placement and routing such as partial configuration is complex.

The circuit data processing system 100 illustrated in FIG. 1 obtains, for multiple circuit configurations each including a common circuit and a non-common circuit, pre-placement-and-routing circuit design data about each of the circuit configurations from the user, and provides placement and routing data to the user. The placement and routing data is data used to implement each circuit configuration in a reconfigurable circuit by constrained placement and routing.

Figure 4:
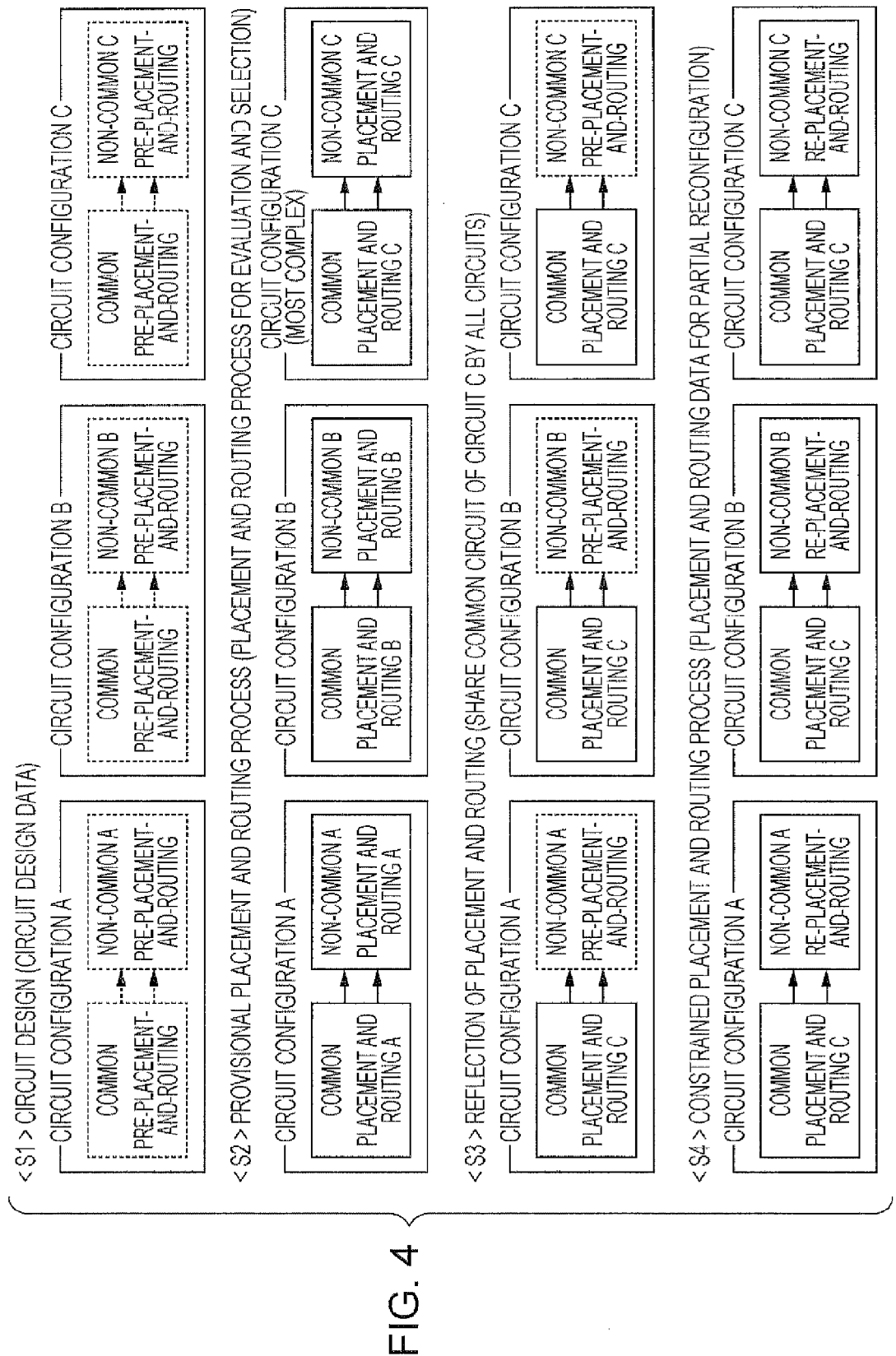
FIG. 4 illustrates a specific example of processing executed in a circuit data processing system.

FIG. 4 illustrates a specific example of processing executed in the circuit data processing system 100. FIG. 4 depicts the state of each circuit configuration in each of process stages from circuit design <S1> to a constrained placement and routing process <S4>. While FIG. 4 depicts three circuit configurations, circuit configurations A to C, as specific examples of multiple circuit configurations, the processing may be performed for only two circuit configurations such as the circuit configurations A and B, or four or more circuit configurations including circuit configurations D, E, F, and so on added to the circuit configurations A to C.

First, in the circuit design <S1>, circuit design data about each circuit configuration is created. Circuit design data refers to data that represents the specific circuit structure of each circuit configuration at the circuit diagram level. For example, circuit design data is designed by a user wishing to use a reconfigurable circuit. That is, a user wishing to implement image processing or other data processing, or control of a device, an apparatus, or the like creates circuit design data for multiple circuit configurations, in accordance with the data processing or control the user wishes to implement by using a reconfigurable circuit.

Each circuit configuration includes a common circuit and a non-common circuit. For example, in the specific example illustrated in FIG. 4, a circuit configuration A includes a common circuit (common) and a non-common circuit A (non-common A), a circuit configuration B includes a common circuit (common) and a non-common circuit B (non-common B), and a circuit configuration C includes a common circuit (common) and a non-common circuit C (non-common C).

A common circuit is a circuit that is common to multiple circuit configurations. For example, the structure, function, and the like of a common circuit included in the circuit design data of each of the circuit configurations A to C are the same between the multiple circuit configurations A to C. A non-common circuit is a circuit that is different for each circuit configuration. For example, the structure, function, and the like of a non-common circuit included in the circuit design data of each of the circuit configurations A to C is unique to each of the circuit configurations A to C.

Circuit design data designed by the user is provided to the circuit data processing device 10 from the user. On the basis of the circuit design data obtained from the user, the circuit data processing device 10 performs a provisional placement and routing process <S2> in a reconfigurable circuit by using the place-and-route tool T.

In the provisional placement and routing process <S2>, circuits according to circuit design data about each one of multiple circuit configurations are formed one after another in a reconfigurable circuit independently for each circuit configuration. That is, by the place-and-route tool T, unconstrained provisional placement and routing is performed for each circuit configuration, with all of PEs in the reconfigurable circuit being objects to be selected. The place-and-route tool T may also implement an unconstrained provisional placement and routing process through, for example, a simulation according to circuit design data about each circuit configuration, without performing actual placement and routing in a reconfigurable circuit.

In the specific example illustrated in FIG. 4, an unconstrained placement and routing process is performed independently for each of the circuit configurations A to C. As a result, placement and routing A for a common circuit and placement and routing A for a non-common circuit A are implemented with respect to the circuit configuration A, placement and routing B for a common circuit and placement and routing B for a non-common circuit B are implemented with respect to the circuit configuration B, and placement and routing C for a common circuit and placement and routing C for a non-common circuit C are implemented with respect to the circuit configuration C. Because placement and routing are performed independently for each of the circuit configurations A to C, the placement and routing A for the common circuit in circuit configuration A, the placement and routing B for the common circuit in circuit configuration B, and the placement and routing C for the common circuit in circuit configuration C usually differ from one another, although these placements and routings may match by chance.

Then, on the basis of the results of the provisional placement and routing process <S2>, evaluation indices on placement and routing are acquired for each individual circuit configuration. Further, the evaluating and selecting unit 14 evaluates the complexity of the placement and routing of each circuit configuration on the basis of the evaluation indices on each circuit configuration, and selects a circuit configuration that satisfies a criterion for the complexity of placement and routing from among multiple circuit configurations. As a circuit configuration that satisfies a criterion for the complexity of placement and routing, the evaluating and selecting unit 14 selects, for example, the most complex circuit whose placement and routing is the most complex among the multiple circuit configurations.

FIG. 5 illustrates a specific example of processing from acquisition of evaluation indices to selection of the most complex circuit. First, with respect to multiple circuit configurations, evaluation indices related to the placement and routing of each of the circuit configurations are acquired. For example, as in the specific example illustrated in FIG. 5A, evaluation indices for each of the circuit configurations A to C are acquired from the results of a provisional placement and routing process.

A provisional placement and routing process is performed by using the place-and-route tool T. The place-and-route tool T determines, by trial and error, the placement (selection) of a large number of PEs included in a reconfigurable circuit and the routing between the PEs, thereby implementing a circuit placement and routing process according to circuit design data about each circuit configuration. The place-and-route tool T may also implement a provisional placement and routing process through, for example, a simulation according to circuit design data about each circuit configuration, without performing actual placement and routing in a reconfigurable circuit. Evaluation indices are acquired for each individual circuit configuration from the provisional placement and routing process implemented in this way.

For example, as in the specific example illustrated in FIG. 5A, the number of feedback loops (FB loop count), place-and-route time, routing count, and PE count are acquired as evaluation indices.

The FB loop count represents the number of FB loops included in the circuit of each circuit configuration. Generally, the larger the FB count, the more complex the resulting placement and routing.

The place-and-route time represents the time required for provisional placement and routing of each circuit configuration. Generally, the more complex the placement and routing, the greater (longer) the place-and-route time.

The routing count represents the total number of routings (paths) between PEs used for provisional placement and routing of each circuit configuration. Generally, the greater the routing count, the more complex the resulting placement and routing.

The PE count represents the total number of PEs used for provisional placement and routing of each circuit configuration. Generally, the greater the PE count, the more complex the resulting placement and routing.

The FB loop count is counted on the basis of pre-placement-and-routing circuit design data of each circuit configuration, for example. The place-and-route time, the routing count, and the PE count are counted by the place-and-route tool T, and provided to the circuit data processing circuit 10 from the place-and-route tool T after provisional placement and routing of each circuit configuration.

The evaluation indices illustrated in FIG. 5A are merely a specific exemplary example, and other specific evaluation indices may be used. For example, the number of attempts required for the provisional placement and routing process of each circuit configuration may be added to the evaluation indices.

When the evaluation indices on each circuit configuration are acquired, the evaluating and selecting unit 14 evaluates the complexity of the provisional placement and routing of each circuit configuration, on the basis of the evaluation indices on each circuit configuration. From the evaluation indices on each circuit configuration, the evaluating and selecting unit 14 calculates a complexity for each individual circuit configuration by using, for example, a calculation formula provided in advance or a calculation formula (Equation 1) described later in detail. For example, as in the specific example illustrated in FIG. 5B, a complexity S is calculated for each of the circuit configurations A to C.

Further, the evaluating and selecting unit 14 selects the most complex circuit whose placement and routing is the most complex among multiple circuit configurations. In the specific example illustrated in FIG. 5B, the complexity S of the circuit configuration C is the highest (greatest). Hence, as illustrated in FIG. 5C, the circuit configuration C is selected as the most complex circuit.

Returning to FIG. 4, when the most complex circuit is selected on the basis of the results of the provisional placement and routing process <S2>, in reflection of placement and routing <S3>, the placement and routing related to the common circuit in the most complex circuit is reflected on the other circuit configurations.

For example, as in the specific example illustrated in FIG. 4, when the circuit configuration C is selected as the most complex circuit on the basis of the results of the provisional placement and routing process <S2>, in the reflection of placement and routing <S3>, the placement and routing C of the common circuit in the circuit configuration C is reflected on the other circuit configurations. That is, the placement and routing C of the common circuit in the circuit configuration C which is the most complex circuit is provided to the place-and-route tool T, and serves as the placement and routing of the common circuit for multiple (all of) circuit configurations A to C. Consequently, for each of the circuit configurations A to C, only the common circuit is placed and routed, and the non-common circuit remains in a pre-placement-and-routing state. The constrained placement and routing process <S4> is performed in this state.

In the constrained placement and routing process <S4>, the placement-and-routing processor 16 uses the place-and-route tool T to redo the placement and routing of the non-common circuit while sharing the placement and routing of the common circuit by multiple circuit configurations. For example, as in the specific example illustrated in FIG. 4, with respect to multiple circuit configurations A to C, while maintaining the placement and routing C of their common circuit, placement and routing of each of the non-common circuits A to C is performed by using PEs other than the PEs used for the placement and routing C. The place-and-route tool T may also implement a constrained placement and routing process through, for example, a simulation according to circuit design data about each circuit configuration, without performing actual placement and routing in a reconfigurable circuit.

In this way, a constrained placement and routing process is executed with respect to multiple circuit configurations, and for each of the circuit configurations, placement and routing data for performing constrained placement and routing is generated, and the generated placement and routing data is provided to the user. On the basis of the provided placement and routing data, the user implements partial reconfiguration of a reconfigurable circuit the user uses. For example, in the case of implementing partial reconfiguration of the multiple circuit configurations A to C obtained in the constrained placement and routing process <S4> according to the specific example illustrated in FIG. 4, within the user's reconfigurable circuit, only the placement and routing of the non-common circuits A to C is changed (partially reconfigured) while the placement and routing C of the common circuit is maintained.

In the circuit data processing system 100 illustrated in FIG. 1, the most complex circuit whose provisional placement and routing is the most complex is selected from among multiple circuit configurations, and constrained placement and routing is performed while sharing the placement and routing of the common circuit of the most complex circuit by the multiple circuit configurations. Consequently, the success rate of constrained provisional placement and routing improves in comparison to a case where a circuit configuration other than the most complex circuit is selected. As a result, for example, the time required for circuit design using a circuit design tool may be shortened, thereby enabling efficient circuit design.

For example, in the specific example illustrated in FIG. 4, it is the circuit configuration C for which the provisional placement and routing process <S2> is the most complex. That is, the combination <C+C> of the placement and routing C of the common circuit and the placement and routing C of the non-common circuit C is the most complex combination. Accordingly, it is highly likely that the combination (C+A) of the placement and routing C of the common circuit and the re-placement-and-routing of the non-common circuit A, and the combination (C+B) of the placement and routing C of the common circuit and the re-placement-and-routing of the non-common circuit B are less complex than the combination (C+C) of the placement and routing C of the common circuit and the placement and routing C of the non-common circuit C. The lower the complexity, the easier the placement and routing and the higher the possibility (success rate) of being able to implement the placement and routing.

If the most complex circuit is selected and then constrained placement and routing fails, selection of a circuit configuration and constrained placement and routing may be repeatedly executed until constrained placement and routing succeeds, by successively selecting circuit configurations with the second highest complexity, the third highest complexity, the fourth highest complexity, and so on in order from the one with the next highest complexity.

Although it is desirable to select the most complex circuit with the most complex placement and routing first, another circuit configuration that satisfies a criterion for the complexity of placement and routing may be selected first from among multiple circuit configurations. For example, multiple circuit configurations may be divided into a group with high complexity and a group with low complexity, and one or multiple circuit configurations may be selected from the group with high complexity.

In the circuit data processing system 100 illustrated in FIG. 1, the circuit data processing device 10 may make reference to a database when evaluating the complexity of provisional placement and routing.

FIG. 6 illustrates a specific example of a database. The database accumulates correspondence data with respect to multiple circuits. The correspondence data is data in which evaluation indices about placement and routing of each circuit are associated with the complexity of placement and routing. The database is stored in the data memory 26 of the database management device 20.

For example, as illustrated in FIG. 6, the values of FB loop count, place-and-route time, routing count, and PE count as evaluation indices, and the value of complexity S are accumulated in association with each other as the correspondence data for each individual circuit.

The specific example of evaluation indices illustrated in FIG. 6 corresponds to the specific example of evaluation indices illustrated in FIG. 5. The evaluation indices illustrated in FIG. 6 are merely a specific exemplary example, and other specific evaluation indices may be used. For example, the number of attempts required for the placement and routing process of each circuit configuration may be added to the evaluation indices.

The value of each evaluation index in the correspondence data is obtained by placing and routing a circuit in a reconfigurable circuit. That is, for example, the FB loop count is counted on the basis of the circuit design data of a circuit that has been placed and routed, and the place-and-route time, the routing count, and the PE count are counted, for example, in the place-and-route tool that has performed the placement and routing. Then, the values of each evaluation index with respect to multiple circuits are accumulated in the database as empirical values of placement and routing with respect to the multiple circuits.

The complexity S of the correspondence data may, for example, be determined by the judgment of an engineer or the like experienced in the use of reconfigurable circuits, or may be determined statistically on the basis of the results of placements and routings executed several times in the past. Of course, the value of the complexity S may be modified as appropriate. The complexity S may be determined in accordance with whether or not placement and routing has succeeded. For example, the complexity S may be determined to be the minimum value when placement and routing has succeeded, and the complexity S may be determined to be the maximum value when placement and routing has failed.

The database is updated by the data updating unit 24. For example, when correspondence data about each circuit is acquired anew, the data updating unit 24 updates the database by adding the newly acquired correspondence data about each individual circuit to the database. The data updating unit 24 may update the database by modifying correspondence data already accumulated in the database. For example, the complexity S of correspondence data already accumulated in the database may be modified on the basis of the results of placement and routing related to the new circuit.

The correspondence data accumulated in the database is used for evaluation of complexity in the evaluating and selecting unit 14 of the circuit data processing device 10. For example, on the basis of correspondence data accumulated in the database, a calculation formula for calculating a complexity from the values of evaluation indices is determined. The calculation formula is defined by, for example, the following Equation 1.

$$S = \alpha 1 \times (x1) + \alpha 2 \times (x2) + \alpha 3 \times (x3) + \alpha 4 \times (x4)$$

S: complexity
$\alpha 1, \alpha 2, \alpha 3, \alpha 4$: coefficients
x1, x2, x3, x4: evalues of evaluation indices The coefficient generator 28 of the database management device 20 calculates, for example, coefficients $\alpha(\alpha 1$ to $\alpha 4)$ in Equation 1 as derivation data for deriving a complexity from the values of evaluation indices, on the basis of correspondence data about multiple circuits accumulated in the database.

In calculating the coefficients $\alpha$, the coefficient generator 28 determines a matrix X related to evaluation index and a matrix S with respect to complexity as illustrated in FIG. 6, on the basis of correspondence data about multiple circuits accumulated in the database. In the matrix X, the values of multiple evaluation indices with respect to individual circuits accumulated in the database are arranged in the row direction, and the values of each evaluation index with respect to multiple circuits are arranged in the column direction. In addition, in the matrix S, complexities S with respect to multiple circuits accumulated in the database are arranged in the column direction. A matrix $\alpha$ is an arrangement in the column direction of the coefficients $\alpha(\alpha 1$ to $\alpha 4)$ in Equation 1.

Then, the following Equation 2 is obtained with respect to the matrix X, the matrix $\alpha$, and the matrix S from Equation 1.

$$X\alpha = S$$

Further, proceeding with a matrix computation from Equation 2 yields the following Equation 3 for determining the matrix $\alpha$.

$$X^T X \alpha = X^T S$$

$$\alpha = (X^T X)^{-1} X^T S$$

The coefficient generator 28 determines the matrix X of evaluation indices and the matrix S of complexities on the basis of correspondence data about multiple circuits accumulated in the database, and calculates the matrix $\alpha$, that is, the coefficients $\alpha$ ($\alpha 1$ to $\alpha 4$) in Equation 1 on the basis of Equation 3. Incidentally, calculating the matrix $\alpha$ related to the coefficients $\alpha 1$ to $\alpha 4$ by using the least squares method on the basis of the specific example of the database illustrated in FIG. 6, that is, the specific example of correspondence data for Circuit 1 to Circuit 5 yields the results represented by the following Equation 4.

$$\alpha = \begin{bmatrix} 3.22 \times 10 \\ 2.90 \times 10^{-1} \\ 1.41 \times 10^{-2} \\ 3.54 \end{bmatrix}$$

The database management device 20 provides, as reference data, the coefficients $\alpha$ ($\alpha 1$ to $\alpha 4$) calculated in the coefficient generator 28 to the circuit data processing device 10. By using the coefficients $\alpha$ ($\alpha 1$ to $\alpha 4$) thus provided, the evaluating and selecting unit 14 of the circuit data processing device 10 calculates a complexity on the basis of Equation 1 from the values of evaluation indices on each individual circuit configuration.

Incidentally, with respect to the specific example of evaluation indices illustrated in FIG. 5A, that is, the specific example of evaluation indices with respect to the circuit configurations A to C, when the respective complexities S of the circuit configurations A to C are calculated by applying the coefficients $\alpha$ ($\alpha 1$ to $\alpha 4$) in Equation 4 to Equation 1, the calculation results of complexities S as illustrated in FIG. 5B are obtained.

The database management device 20 may provide, as reference data, correspondence data about multiple circuits accumulated in the database to the circuit data processing device 10, and the circuit data processing device 10 may calculate the matrix $\alpha$, that is, the coefficients $\alpha$ ($\alpha 1$ to $\alpha 4$) in Equation 1 on the basis of Equation 3.

While exemplary embodiments of the invention have been described above, the above-mentioned embodiments are merely illustrative in all respects, and not intended to limit the scope of the present invention. The present invention is intended to cover various modifications and variations without departing from the spirit and scope of the invention.

What is claimed is:

1. A circuit information processing device comprising:
a memory; and
one or more processors configured to:
   determine a complexity of placement and routing for each of a plurality of circuit configurations of a reconfigurable circuit, the plurality of circuit configurations each having a common portion and a non-common portion, the common portion comprising processing elements or circuits that are common to the plurality of circuit configurations, the non-common portion comprising processing elements or circuits that are not common to the plurality of circuit configurations;
   select a reference circuit configuration from among the plurality of circuit configurations, the reference circuit configuration being a circuit configuration satisfying a predetermined criterion based on the determined complexity of placement and routing;

replace placement and routing information of the common portion for each circuit configuration of the plurality of circuit configurations other than the reference circuit configuration with placement and routing information of the common portion of the reference circuit configuration;

generate placement and routing information of the non-common portion for each of the circuit configurations of the plurality of circuit configurations other than the reference circuit configuration, the second placement and routing information being information for placing and routing the non-common portion; and transmit at least one of the replaced processing and routing information for the common portion and the generated placement and routing information for the non-common portion to an information processing device configured for at least one of the plurality of circuit configurations, the transmitted placement and routing information configured to, when executed by a processor, reconfigure a reconfigurable circuit based on the received placement and routing information.

2. The circuit information processing device according to claim 1, wherein the reference circuit configuration that satisfies the criterion, is a circuit configuration whose placement and routing is the most complex from among the plurality of circuit configurations.

3. The circuit information processing device according to claim 1, wherein the one or more processors are further configured to: determine a degree of the complexity on a basis of an evaluation index, the evaluation index being related to placement and routing of a plurality of circuits on a reconfigurable circuit.

4. The circuit information processing device according to claim 2, wherein the one or more processors are further configured to: determine a degree of the complexity on a basis of an evaluation index, the evaluation index being related to placement and routing of a plurality of circuits on a reconfigurable circuit.

5. A database system comprising:
a memory that stores correspondence data, the correspondence data being data in which evaluation indices about placement and routing of each circuit of a plurality of processing elements or circuits are associated with a degree of complexity of placement and routing; and
a processor configured to:
select, based on the correspondence data, a reference circuit configuration among the plurality of circuit configurations, the reference circuit configuration being a circuit configuration with the highest degree of complexity of placement and routing;
replace placement and routing information of a common portion for each circuit configuration of the plurality of circuit configurations other than the reference circuit configuration with placement and routing information of a common portion of the reference circuit configuration;
re-generate placement and routing information of a non-common portion for each of the circuit configurations of the plurality of circuit configurations other than the reference circuit configuration; and
transmit the replaced processing and routing information for the common portion and the re-generated placement and routing information for the non-common portion for at least one of the plurality of circuit configurations other than the reference circuit configuration to an information processing device configured to reconfigure a reconfigurable circuit based on received placement and routing information.

6. The database system according to claim 5, wherein:
the memory further stores a plurality of correspondences;
the processor is configured to further transmit the correspondence data to the information processing device, and
the correspondence data indicates the plurality of correspondences.

7. The database system according to claim 5, wherein the processor is further configured to: update the correspondence data by adding a correspondence obtained for each of the plurality of circuit configurations to the memory.

8. The database system according to claim 6, wherein the processor is further configured to: update the correspondence data by adding a correspondence obtained for each of the plurality of circuit configurations to the memory.

9. A circuit information processing system comprising:
a memory; and
a processor configured to:
determine a complexity of provisional placement and routing for each of a plurality of circuit configurations of a reconfigurable circuit, the plurality of circuit configurations each having a common portion and a non-common portion, the common portion comprising processing elements or circuits that are common to the plurality of circuit configurations, the non-common portion comprising processing elements or circuits that are not common to the plurality of circuit configurations,
select a reference circuit configuration from among the plurality of circuit configurations, the reference circuit configuration being a circuit configuration satisfying a predetermined criterion based on the determined complexity of placement and routing;
replace placement and routing information of the common portion for each circuit configuration of the plurality of circuit configurations other than the reference circuit configuration with placement and routing information of the common portion of the reference circuit configuration; and
generate placement and routing information of the non-common portion for each of the circuit configurations of the plurality of circuit configurations other than the reference circuit configuration; and
transmit at least one of the replaced processing and routing information for the common portion and the generated placement and routing information for the non-common portion to an information processing device configured for at least one of the plurality of circuit configurations, wherein
the transmitted placement and routing information is configured to, when executed by a processor, reconfigure a reconfigurable circuit based on the received placement and routing information,
the memory is configured to store a database including a correspondence for each of a plurality of circuits,
the correspondence is a correspondence between an evaluation index related to placement and routing of each of the circuits on a reconfigurable circuit, and a degree of complexity of the placement and routing, and
the processor is further configured to determine the complexity of provisional placement and routing for each of the plurality of circuit configurations of the reconfigurable circuit based on the degree of complexity.

10. A non-transitory computer readable medium storing a program causing a computer to execute a process, the process comprising:

determining a complexity of placement and routing of each of a plurality of circuit configurations of a reconfigurable circuit, the plurality of circuit configurations each having a common portion and a non-common portion, the common portion comprising processing elements or circuits that are common to the plurality of circuit configurations, the non-common portion comprising processing elements or circuits that are not common to the plurality of circuit configurations;

selecting a reference circuit configuration from among the plurality of circuit configurations, the reference circuit configuration being a circuit configuration satisfying a predetermined criterion based on the determined complexity of placement and routing;

replacing placement and routing information of the common portion for each circuit configuration of the plurality of circuit configurations other than the reference circuit configuration with placement and routing information of the common portion of the reference circuit configuration;

generating placement and routing information of the non-common portion for each of the circuit configurations of the plurality of circuit configurations other than the reference circuit configuration; and transmitting at least one of the replaced processing and routing information for the common portion and the generated placement and routing information for the non-common portion to an information processing device configured for at least one of the plurality of circuit configurations, the transmitted placement and routing information configured to, when executed by a processor, reconfigure a reconfigurable circuit based on the received placement and routing information.

11. A non-transitory computer readable medium storing a program causing a computer to execute a process, the process comprising:

storing, as correspondence data, a correspondence between an evaluation index related to placement and routing of each of a plurality of circuits on a reconfigurable circuit, and a degree of complexity of the placement and routing;

determining, based on the stored correspondence data, a complexity of provisional placement and routing for each of the plurality of circuit configurations, the plurality of circuit configurations each having a common portion and a non-common portion, the common portion comprising processing elements or circuits that are common to the plurality of circuit configurations, the non-common portion comprising processing elements or circuits that are not common to the plurality of circuit configurations, selecting a reference circuit configuration from among the plurality of circuit configurations, the reference circuit configuration being a circuit configuration satisfying a predetermined criterion based on the determined complexity of placement and routing;

replacing placement and routing information of the common portion for each circuit configuration of the plurality of circuit configurations other than the reference circuit configuration with placement and routing information of the common portion of the reference circuit configuration;

generating placement and routing information of the non-common portion for each of the circuit configurations of the plurality of circuit configurations other than the reference circuit configuration; and transmitting at least one of the replaced processing and routing information for the common portion and the generated placement and routing information for the non-common portion to an information processing device configured for at least one of the plurality of circuit configurations.

12. A circuit design method comprising:

determining a complexity of provisional placement and routing of each of a plurality of circuit configurations of a reconfigurable circuit, the plurality of circuit configurations each having a common portion and a non-common portion, the common portion comprising processing elements or circuits that are common to the plurality of circuit configurations, the non-common portion comprising processing elements or circuits that are not common to the plurality of circuit configurations;

selecting a reference circuit configuration from among the plurality of circuit configurations, the reference circuit configuration being a circuit configuration satisfying a predetermined criterion based on the determined complexity of placement and routing;

replacing the common portion of each circuit configuration of the plurality of circuit configurations other than the reference circuit configuration with the common portion of the selected reference circuit configuration;

generating the placement and routing information of the non-common portion for each of the circuit configurations independently in each of the circuit configurations; and transmitting at least one of the replaced processing and routing information for the common portion and the generated placement and routing information for the non-common portion to an information processing device configured for at least one of the plurality of circuit configurations, the transmitted placement and routing information configured to, when executed by a processor, reconfigure a reconfigurable circuit based on the received placement and routing information.

* * * * *